(12) United States Patent
Chaney et al.

(10) Patent No.: US 6,195,089 B1
(45) Date of Patent: *Feb. 27, 2001

(54) TELEVISION GRAPHICAL USER INTERFACE HAVING VARIABLE CHANNEL CHANGER ICONS

(75) Inventors: Jack Chaney, Gilroy; Steve Blonstein, Palo Alto; Keit Khauv, San Jose; Fai-To Leung, Sunnyvale; Kevin Harms, San Jose, all of CA (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

This patent is subject to a terminal disclaimer.

(21) Appl. No.: 08/747,692

(22) Filed: Nov. 12, 1996

Related U.S. Application Data
(60) Provisional application No. 60/023,904, filed on Aug. 14, 1996.

(51) Int. Cl.[7] ............................. H04N 5/445; H04N 5/50; H04N 7/173
(52) U.S. Cl. .................. 345/327; 345/157; 345/158; 345/145; 455/4.2; 455/5.1; 348/563; 348/12; 348/13; 348/906
(58) Field of Search ................... 348/563, 564, 348/569, 570, 589, 6, 7, 10, 12, 13, 906; 455/4.2, 5.1, 6.1, 6.2; 345/158, 157, 145, 146, 348, 352, 341, 327, 342

(56) References Cited

U.S. PATENT DOCUMENTS

| 5,045,843 | 9/1991 | Hansen ................... 340/709 |
|---|---|---|
| 5,198,901 | 3/1993 | Lynch .................... 358/136 |
| 5,293,229 | 3/1994 | Iu ........................ 348/415 |
| 5,311,310 | 5/1994 | Jozawa et al. ............ 348/426 |
| 5,359,348 | 10/1994 | Pilcher et al. ........... 345/158 |
| 5,361,105 | 11/1994 | Iu ........................ 348/699 |
| 5,386,234 | 1/1995 | Veltman et al. ........... 348/409 |
| 5,400,076 | 3/1995 | Iwamura .................. 348/416 |
| 5,416,535 | * 5/1995 | Sato ...................... 348/705 |
| 5,479,268 | * 12/1995 | Young .................... 348/906 |
| 5,489,947 | 2/1996 | Cooper ................... 348/589 |
| 5,585,866 | * 12/1996 | Miller ................... 348/570 |
| 5,629,733 | * 5/1997 | Youman .................... 348/7 |
| 5,731,844 | * 3/1998 | Rauch .................... 348/563 |
| 5,767,852 | * 6/1998 | Keller ................... 345/348 |
| 5,786,805 | * 7/1998 | Barry .................... 345/159 |
| 5,793,367 | * 8/1998 | Taguchi .................. 345/330 |
| 5,835,156 | * 11/1998 | Blonstein ................ 348/569 |
| 5,874,966 | * 2/1999 | Polimeni ................. 345/431 |
| 5,880,768 | * 3/1999 | Lemmons .................. 348/1 |
| 5,896,133 | * 4/1999 | Lynch .................... 345/357 |
| 5,898,835 | * 4/1999 | Truong ................... 395/200.47 |
| 5,955,988 | * 11/1999 | Blonstein ................ 342/359 |
| 5,978,043 | * 11/1999 | Blonstein ................ 348/569 |
| 6,016,144 | * 1/2000 | Blonstein ................ 345/342 |

* cited by examiner

Primary Examiner—Mark R. Powell
Assistant Examiner—Wesner Sajous
(74) Attorney, Agent, or Firm—Kenneth L. Sherman, Esq.; Sherman & Sherman; Jeffrey P. Aiello

(57) ABSTRACT

A TV graphical user interface provided on a TV screen includes a graphical channel changer for enabling a user to select a required TV channel among about 1000 channels provided by a satellite TV system. The graphical channel changer contains a vertical channel bar composed of channel boxes that display numbers and logos of selected TV channels. To switch a TV set to a required TV channel, the user directs the pointing device at the graphical channel box that indicates the required channel. Up and down scroll bars, that allow the user to scan through the entire list of TV channels, dynamically alter their size in accordance with the position of the TV channel being currently scanned to provide the user with visual feedback. A relative position indicator is arranged between the up and down scroll bars.

20 Claims, 7 Drawing Sheets

| CLUT location | Red byte | Green Byte | Blue Byte | Output Color |
|---|---|---|---|---|
| S0 | S0 | S0 | S0 | Black |
| S1 | Sff | S0 | S0 | Full Red |
| S2 | S80 | S0 | S0 | Half Red |
| S3 | S40 | S0 | S0 | Dim Red |
| S4 | Sff | Sff | Sff | White |
| S5 | S80 | S80 | S80 | Med. gray |
| S6 | S00 | Sff | S00 | Full Green |
| S7 | S00 | S00 | Sff | Full Blue |
| S8 | S00 | Sff | Sff | Cyan |
| etc | etc | etc | etc | etc |

FIG. 3

TELEVISION GRAPHICAL USER INTERFACE HAVING VARIABLE CHANNEL CHANGER ICONS

This application claims the benefit of U.S. Provisional Application No. 60/023,904 filed Aug. 14, 1996.

TECHNICAL FIELD

The present invention relates to television (TV) systems, and in particular, to a TV graphical user interface (GUI) having novel channel changer bars that dynamically alter their size.

BACKGROUND ART

The growing availability of TV broadcast and interactive services creates a need for a new type of a TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 Ghz.

A digital satellite television system for direct television broadcasting includes a transmitter for transmitting television signals including video and audio components to a satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R–Y), and the second color difference component may represent the difference between the blue image information and the luminance image information (B–Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

To facilitate user access to available TV programs and services, a graphical menu, such as, a list of available TV channels, may be displayed on a TV screen. To select a TV channel, a user may scan through the TV channel list using, for example, control icons displayed on the screen. Inasmuch as the digital satellite television system may provide about 1,000 TV channels, it may be hard to keep track of TV channels being scanned. Therefore, it would be desirable to provide the user with visual feedback that would indicate relative position of TV channels in the TV channel list.

Further, due to "overscan" conditions, a television receiver may produce a raster so that a picture on its screen may not be entirely in the view of the user. To prevent data loss caused by the overscan conditions, TV broadcast systems display images inside a "safe" area located within approximately a 10% border all around the edge of the screen.

In conventional TV systems, graphics data are generated so as to position graphical objects, such as control icons, inside the safe area to ensure that they appear on the screen even under the worst overscan conditions. However, such an arrangement results in reducing the size of graphical objects. This makes them difficult to find and use. The channel list is actually a sequentially ordered list. The order may be with respect to numerical channel number or alphabetical by channel name. Generally, the entire list is large and only some small subsequence of the entire list may be displayed as selectable objects on the screen. It is the location of this displayed subsequence within the full sequence that is provided as graphical feedback to the user by means of dynamically sizing the scroll bars.

Moreover, when there are no overscan conditions or overscan is less than in the worst case, a blank band leaves between the safe area and the edge of the screen.

Therefore, it would be desirable to keep graphical objects large and to fully utilize the screen area independently of overscan.

DISCLOSURE OF THE INVENTION

Accordingly, one advantage of the present invention is in providing a TV graphical user interface (GUI) having a visual feedback system that indicates relative position of TV channels in a TV channel list.

Another advantage of the present invention is in providing a TV GUI having large graphical control objects.

A further advantage of the present invention is in providing a GUI on a TV screen that fully utilizes the screen area independently of overscan.

The above and other advantages of the invention are achieved, at least in part, by providing a TV system that comprises a CPU, and a TV monitor controlled by the CPU for displaying a graphical user interface (GUI) having at least one channel object for identifying TV channels. For example, the channel object may indicate numbers and logos of the TV channels. A control icon is provided for changing the TV channels identified by the channel object. The control icon dynamically varies when the identified TV channels are changed.

In accordance with a first aspect of the invention, the control icon comprises an up scroll bar for scrolling up the TV channels, and a down scroll bar for scrolling down the TV channels. For example, the up and down scroll bars may be activated by a remote pointing device. Activation of the up scroll bar causes the channel object to identify a TV channel that precedes a currently identified TV channel in a channel list. Whereas activation of the down scroll bar causes the channel object to identify a TV channel subsequent to the currently identified TV channel. The up and down scroll bars dynamically vary when the channel object changes the currently identified TV channel.

For example, the up scroll bar may shorten and the down scroll bar may elongate when the channel object replaces the currently identified TV channel with the preceding TV channel. By contrast, the up scroll bar may elongate and the down scroll bar may shorten when the currently identified TV channel is being changed to the subsequent TV channel.

In accordance with another aspect of the invention, the up and down scroll bars extend beyond a safe area provided on a TV screen to accommodate a picture to overscan conditions. The up and down scroll bars may stretch between opposite edges of the screen.

In accordance with a further aspect of the invention, a relative position indicator is arranged between the up scroll bar and the down scroll bar to indicate the position of the currently identified TV channel relative to the channel list.

In accordance with a method of the present invention the following steps are carried out to provide a user with visual feedback during channel scrolling:

decreasing the up scroll bar and increasing the down scroll bar when the up scroll bar is activated to replace a TV channel currently identified by said channel object with a preceding TV channel, and increasing the up scroll bar and decreasing the down scroll bar when the down scroll bar is activated to replace the currently identified TV channel with a subsequent TV channel.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 illustrates contents of a color look up table.

BEST MODE FOR CARRYING OUT THE INVENTION

The best mode for practicing the invention is based on the realization of a satellite receiver in a digital satellite television system. However, it is to be understood that the present invention is applicable to any system for receiving TV signals.

Figure 1:
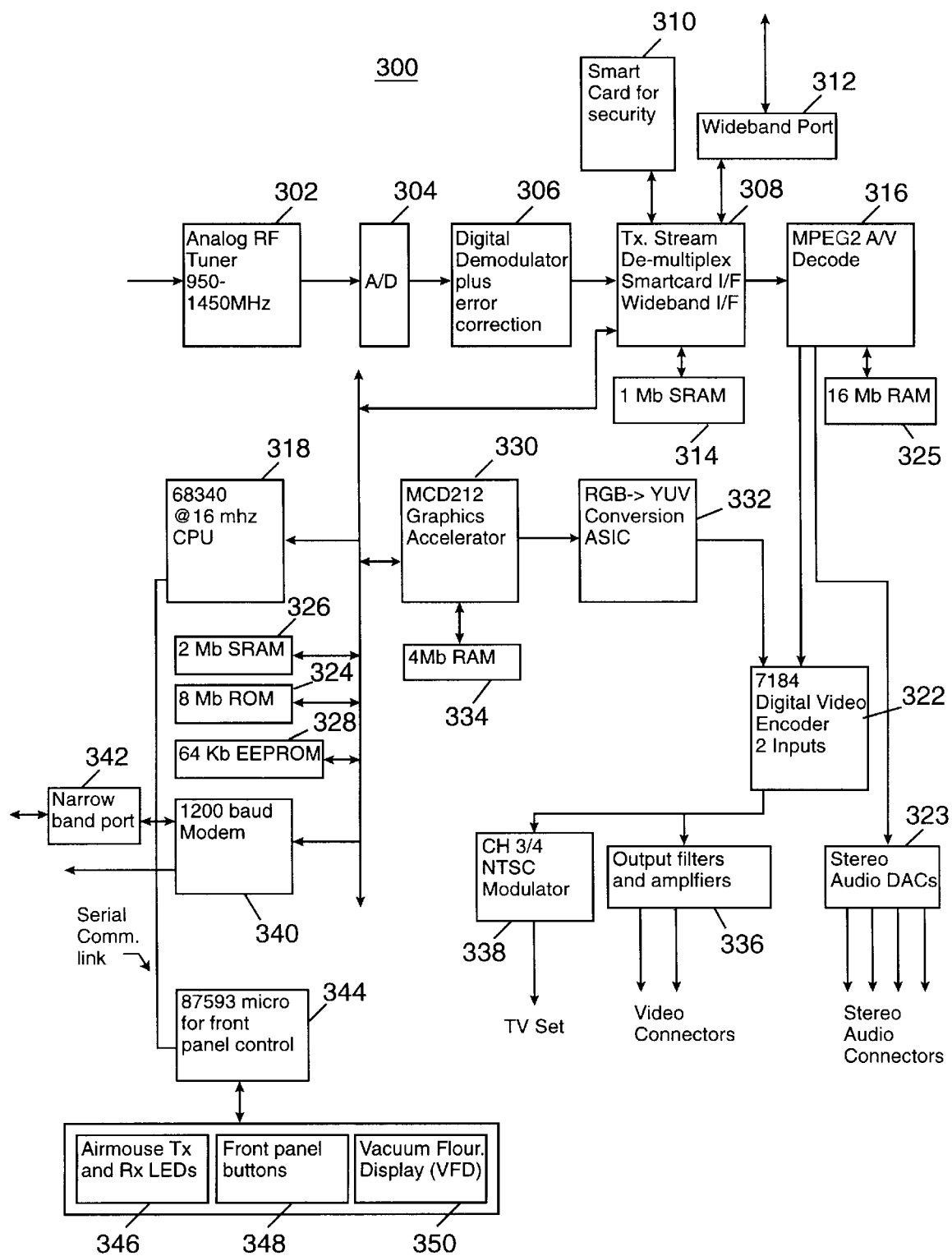
FIG. 1 is a block diagram of a satellite receiver of the present invention.

Reference is now made to FIG. 1 of the drawings wherein an indoor satellite receiver 300 includes an analog radio-frequency (RF) tuner 302 such as a satellite front end demodulator manufactured by Sharp/Comstream. The RF tuner 302 is coupled via an external UHF/VHF to an outdoor unit that receives incoming television signals from a satellite. The outdoor unit may comprise a 18" antenna made of aluminum and dual low noise block converters that convert satellite signals in a frequency range from 12.2–12.7 GHz received by the antenna into the 950–1450 Mhz frequency range signals.

The RF tuner 302 equipped with a local oscillator and mixer selects the appropriate carrier signal corresponding to a selected satellite TV channel from the 950–1450 Mhz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310 such as a Smart Card manufactured by the News Data Corporation controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128K×8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat.

No. 5,400,076 to Iwamura of Mar. 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256K×16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322, and to a stereo audio digital-to-analog converter (DAC) 324 for converting digital audio signals into analog form. A single-chip AK4319 DAC manufactured by Asahi Kasei may be used as the DAC 324.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus, and a 32-bit data bus for internal operations. The CPU 318 may run the PSOS+ operating system developed by Integrated Systems Inc.

The CPU 318 is supported by a ROM 324, a SRAM 326, and an EEPROM 328. The ROM 324 that holds the PSOS+ operating system, menus, fonts, and other fixed data may be formed by two 4Mbit masked ROM chips organized as 512K×8 with access speed of 95 ns.

The SRAM 326 formed, for example, by two 1Mbit SRAM chips organized as 128K×8 with access speed of 70 ns, may be used for storing all active data such as system stacks, variables, menu data, etc. The ROM 324 and SRAM 326 may operate at a zero wait state to provide maximum performance.

The EEPROM 328, for example, a single 8K×8 EEPROM chip with access speed of 150 ns, may store non-volatile data such as user preferences.

To enhance the graphics presentation capabilities of the satellite receiver 300, a graphics accelerator 330 such as a MCD212 graphics accelerator manufactured by Motorola is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4Mbit RAM 334 provided, for example, on a single 256K×16 lDRAM chip with access speed of 70 ns. The RAM 334 used for storing graphics data is capable of storing two graphics planes with 720×480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489,947 to Cooper of Feb. 6, 1996, incorporated herewith by reference, discloses on screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 324 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer are discussed in more detail later.

A modem 340 such as a single-chip SSI 1200-baud modem is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation. For example, the pointing device interface 346 may comprise infrared (IR) transmitter and receiver that provide infrared communications with a pointing device located up to 7 meter away from the receiver 300 at an angle up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there is no menu on the screen, a first click provides a basic control bar of menus across the bottom of the screen. The control menu bar remains active for a preset period, after which it is made invisible if no further signals from the pointing device are detected. Interactions between the GUI and remote pointing device are disclosed in more detail in our copending application SN 08/720,501, entitled "TELEVISION GRAPHICAL USER INTERFACE EMPLOYING REMOTE RANDOM ACCESS POINTING DEVICE," filed concurrently herewith and incorporated by reference.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel controls 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
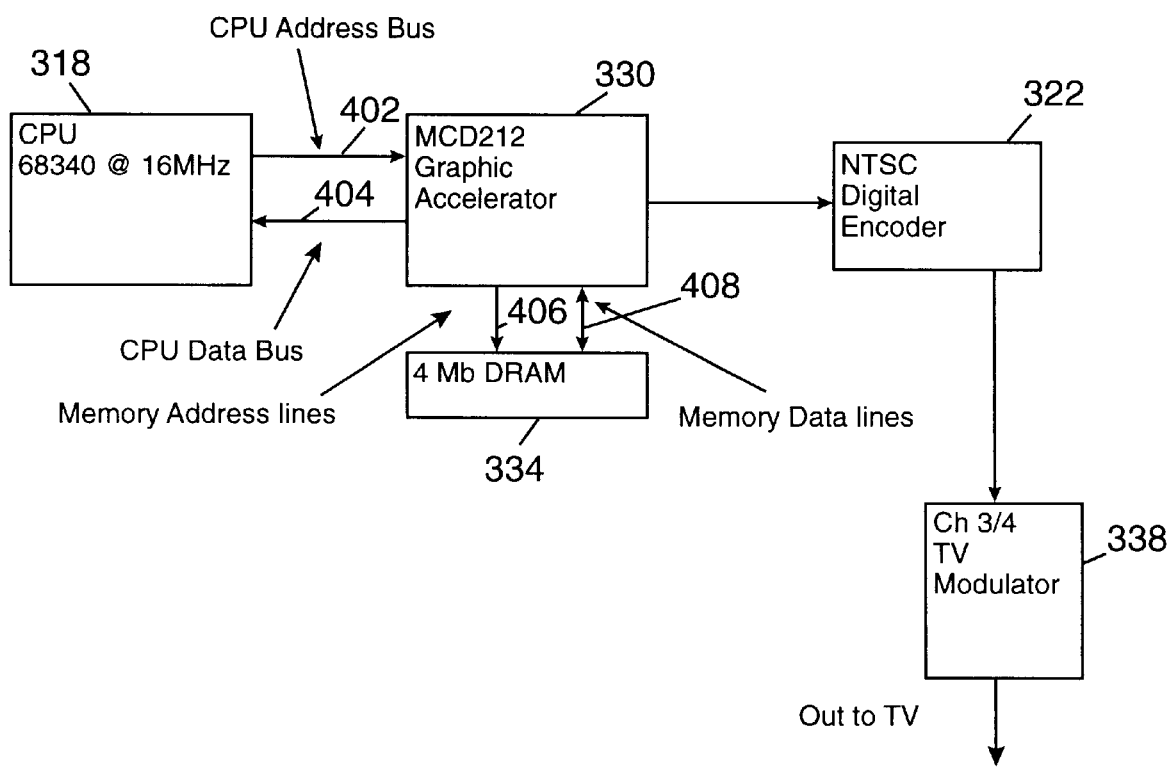
FIG. 2 is a block diagram illustrating a graphical object drawing procedure.

Reference is now made to FIG. 2 that illustrates drawing color graphic objects on a TV screen in accordance with the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402, and a 16-bit data bus 404. The 24-bit address bus 402 enables the CPU 318 to address up to 16Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4Mbit or 512Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
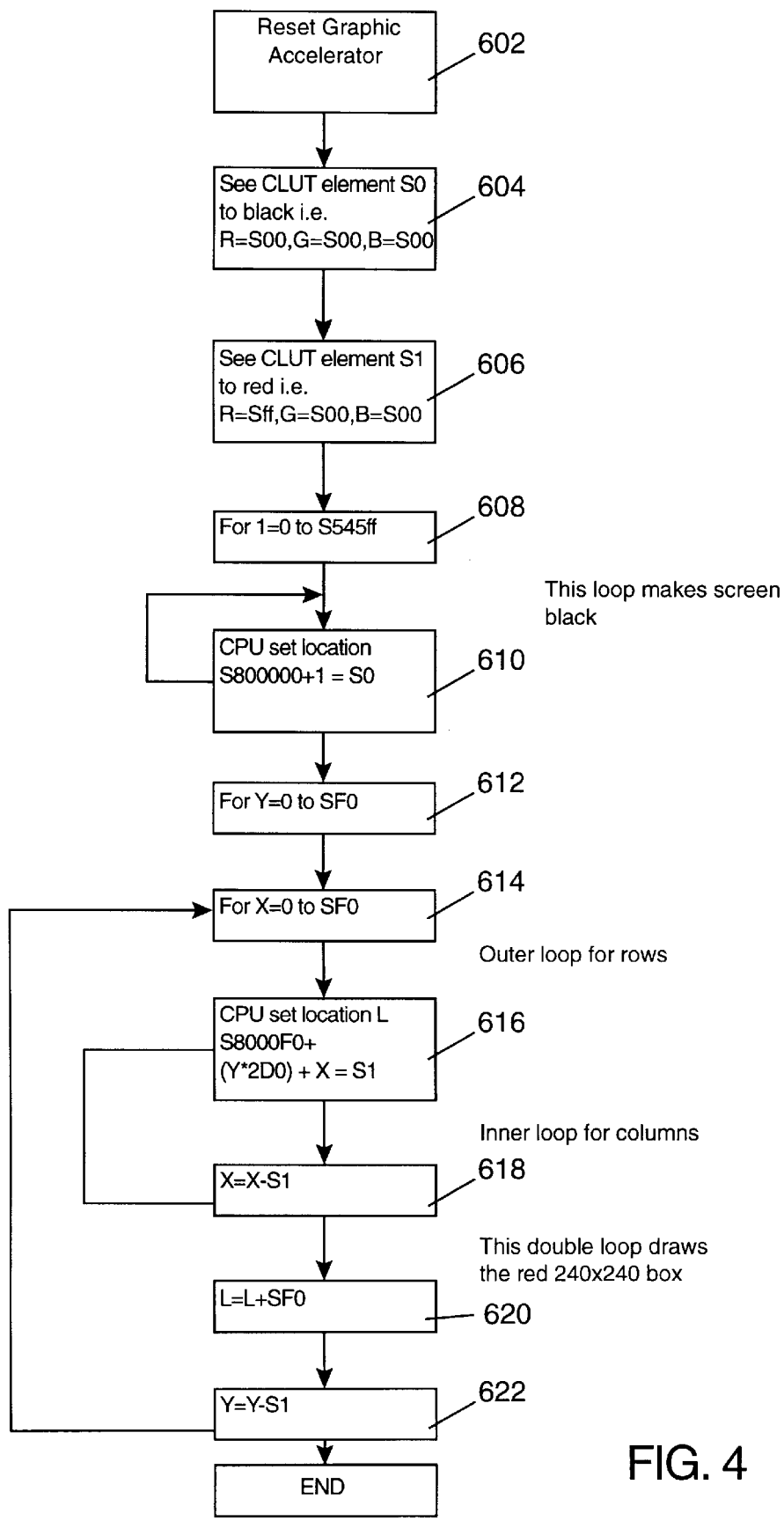
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

Figure 5:
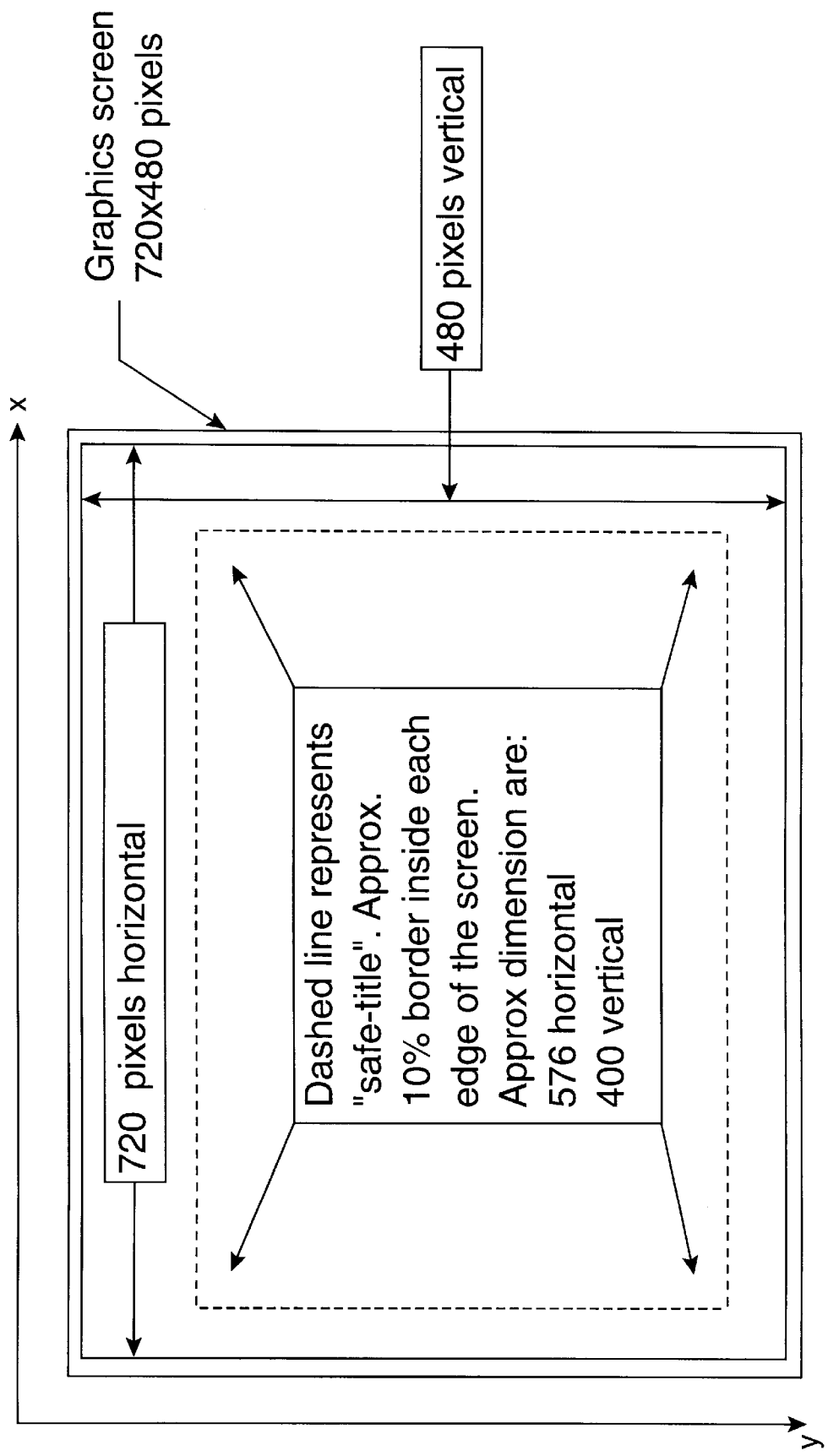
FIG. 5 is a diagram illustrating arrangement of pixels on a TV screen.

For example, as shown in FIG. 5, the TV screen may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform graphics drawing operations, the CPU 318 may use an X, Y-coordinate system shown in FIG. 5, wherein coordinates X=0, Y=0 represent the top left hand corner of the TV screen, and coordinates X=720, Y=480 represent the bottom right hand corner of the screen.

Due to "overscan" conditions, a television receiver may produce a raster on its screen so that pixels in the horizontal and vertical directions may not be entirely in the view of the user. Therefore, TV broadcast systems prevent images from being displayed outside of a "safe" area located within approximately a 10% border all around the edge of the screen. As shown in FIG. 5, the safe area contains approximately 576 pixels in the horizontal direction, and 400 pixels in the vertical direction.

Figure 6:
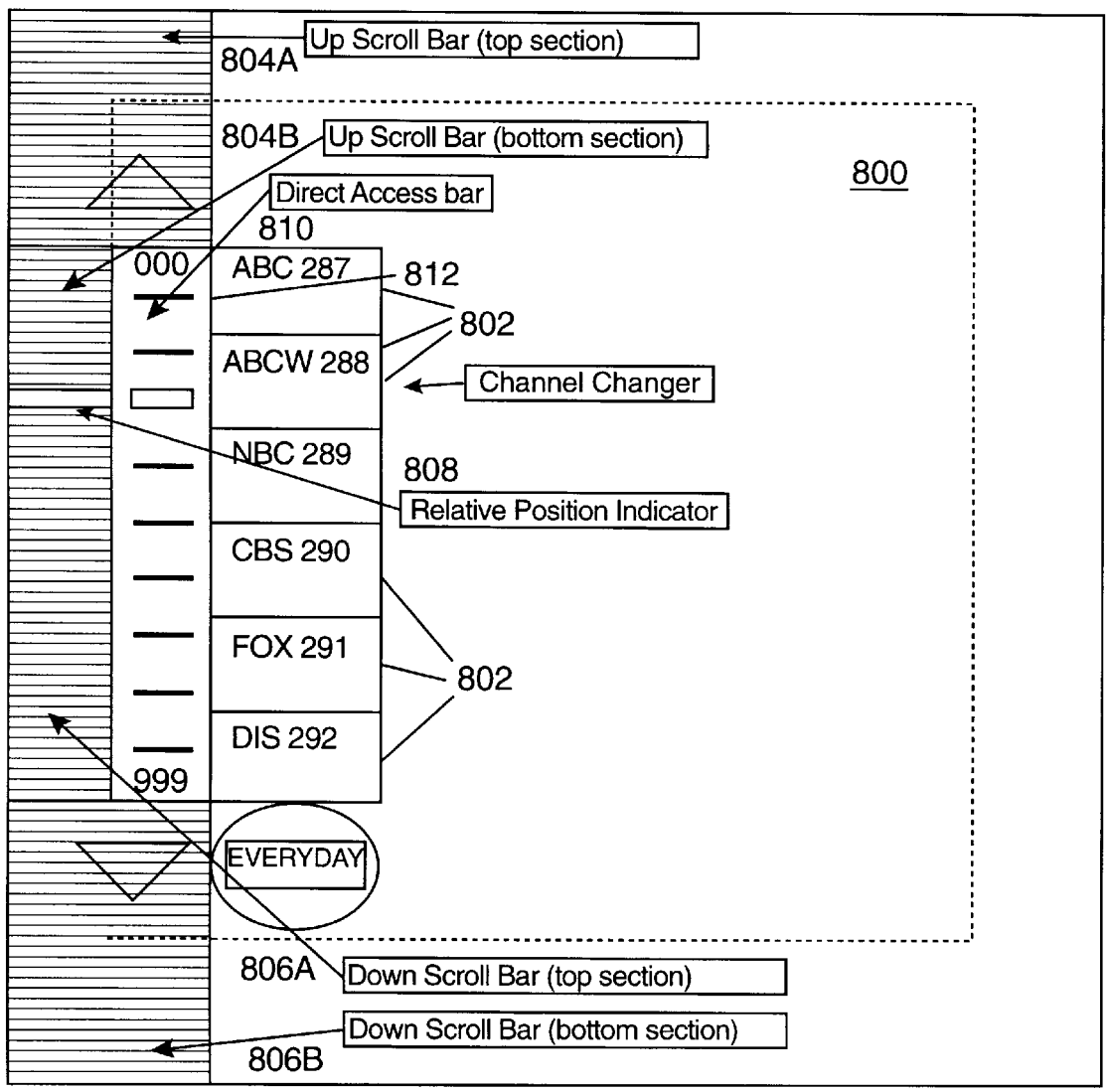
FIG. 6 is a diagram illustrating the GUI on the TV screen in accordance with the present invention.

Reference is now made to FIG. 6, that illustrates the TV GUI of the present invention placed in a channel changer mode for enabling users to select TV channels. An outer solid-lined box represents the edge of a TV screen that displays the GUI, and a dash line shows the border of a safe area on the screen. The TV GUI includes a graphical channel changer 800 having a vertical channel bar composed of graphical channel boxes 802 representing TV channels available in the satellite receiver 300. For example, each box 802 may contain the number and logo of a TV channel. In a digital satellite TV system, the channel bar may represent about 1,000 TV channels. A restricted number of the boxes 802 may be displayed on the TV screen at any given time. For example, FIG. 6 shows that six boxes 802 representing channels 287–292 are simultaneously displayed. The vertical channel bar may be represented by 120×300 pixels. For example, its top left corner may have coordinates X=122, Y=90, and its bottom right corner may be arranged at X=242, Y=390.

To switch the TV set to a required TV channel, the user directs the pointing device at the graphical channel box 802 that contains the number and logo of the required channel. A click of the pointing device button causes the CPU 318 to send a tune command to the RF tuner 302 for switching the satellite receiver 300 to the required TV channel.

Up and down scroll bars 804 and 806 are arranged near the channel boxes 802 to allow a user to scan through the entire list of TV channels in opposite directions. A single click of the pointing device button causes the GUI to move up or down by one channel with respect to the TV channels currently represented in the channel boxes 802. For example, when the user clicks the pointing device held in the direction of the up scroll bar 804, the boxes 802 will shift from channels 287–292 to channels 286–291. If the pointing device points at the down scroll bar 806, a single click will cause the boxes 802 to move from channels 287–292 to channels 288–293. Holding down the pointing device button may cause the list of TV channels to scroll continuously.

A relative position indicator 808 shows the position of the TV channels currently displayed in the channel boxes with respect to the other available TV channels. The relative position indicator 808 is a horizontal strip that determines the boundary between the up and down scroll bars 804 and 806. When the user causes the channels in the channel boxes 802 to move up or down, the relative position indicator 808 also moves up or down.

A direct access bar 810 presented next to the channel boxes 802 causes the GUI to display in the channel boxes 802 numbers and logos of a selected group of channels when the user clicks the pointing device directed at the area of the direct access bar 802 that represents the selected group of channels. The direct access bar 810 comprises a graduated scale representing available TV channels. For example, as shown in FIG. 6, the channel scale may represent 1000 TV channels (from channel 000 to channel 999) provided by the digital satellite TV system 300.

The scroll bars 804 and 806 are extended beyond the safe area to the edge of the screen. As a result, their size is increased. Moreover, the screen area is fully utilized, independently of the overscan conditions.

For example, as indicated by a dash line in FIG. 6, the top left hand corner of the safe area may be arranged at X=72, Y=40. The bottom right hand corner of the safe area may have coordinates X=648, Y=440.

The up scroll bar 804 drawn in accordance with the graphical object drawing procedure discussed above may be composed of a top section 804A and a bottom section 804B. The bottom right corner of the top section 804A may be provided at X=122, Y=90. This position may coincide with the top left point of the top channel box 802. The top left corner of the top section may be generated at the top left corner of the screen at X=0, Y=0. As a result, the top section 804A is extended beyond the safe area in the horizontal and vertical directions.

The bottom section 804B displayed beneath the top section 804A may be formed completely outside the safe area. For example, the top left corner of the bottom section 804B may be selected at X=0, Y=90, and its top right corner may be at X=72, Y=90.

The down scroll bar 806 drawn in accordance with the graphical object drawing procedure discussed above may be composed of a top section 806A and a bottom section 806B.

The bottom section 806B may have its top left corner provided at the vertical edge of the screen, for example, at X=0, Y=390. Its bottom right corner may be arranged at the horizontal edge of the screen, for example, at X=122, Y=480. Thus, the bottom section of the down scroll bar 806 is extended beyond the safe area in the horizontal and vertical directions.

The top section 806A may be arranged above the bottom section 806B. For example, its bottom left corner may be provided at X=0, Y=390, its bottom right corner may be at X=72, Y=390.

As the top edge of the up scroll bar 804 coincides with the top edge of the screen, and the bottom edge of the down scroll bar 806 coincides with the bottom edge of the screen, the scroll bar composed of the up and down scroll bars 804 and 806 appears to wrap around the screen. As a result, the up and down scroll bars are made large enough to facilitate user access to these graphical control buttons during channel selection. Moreover, the screen area is fully utilized independently of the overscan conditions.

In accordance with the present invention, the up scroll bar 804 and down scroll bar 806 dynamically alter their size when a user scans through a list of available TV channels by pressing a button on a pointing device held in the direction of the up scroll bar 804 or down scroll bar 806. In particular, when the user directs the pointing device at the up scroll bar 804 to move up through the channels, the GUI makes the up scroll bar 804 shorter and the down scroll bar 806 longer. By contrast, when the user points at the down scroll bar 806 moving down through the list of available channels, the GUI makes the up scroll bar 804 longer, and the down scroll bar 806 shorter. As a result, the user is provided with visual feedback that shows the relative position of the TV channels currently displayed in the channel boxes 802 with respect to the channel list. For example, when in a 1000 channel TV system, the user moves through channel 500, the up scroll bar 804 and down scroll bar 806 have the same size implying that there are as many channels above the current position in the channel list as below the current position. As discussed above, the top section 804A of the up scroll bar 804, and the bottom section 806B of the down scroll bar 806 may be maintained fixed. The bottom section 804B of the up scroll bar 804, and the top section 806A of the down scroll bar 806 alter their size in the vertical direction along the Y-axis. Their size in the horizontal direction along the X-axis may be maintained fixed.

For the sake of discussion, it is assumed that the relative position strip 808 arranged between the up and down scroll bars 804 and 806 has zero width. In reality, the width of the strip 808 is equal to a few pixels.

Then, if there are 1000 channels of programming available, and the relative position indicator 808 is positioned at channel 300, the bottom section 804B of the up scroll bar 804 stretches from Y=90 to Y=180, whereas the top section 806A of the down scroll bar 806 stretches from Y=180 to Y=390. Thus, the bottom section of the up scroll bar 804 has 90 pixels in the vertical direction, and the top section of the down scroll bar 806 includes 210 pixels.

As the system scrolls, the relative size of the up and down scroll bars 804 and 806 changes. For example, if the user directs the pointing device at the down scroll bar 806 to scroll down by 100 channels, the relative position indicator 808 will be at channel 400. In this case, the bottom section of the up scroll bar 804 is generated from Y=90 to Y=210, and the top section of the down scroll bar 806 is provided from Y=210 to Y=390.

Thus, the bottom section of the up scroll bar 804 elongates from 90 pixels to 120 pixels, and the top section of the down scroll bar 806 shortens from 210 pixels to 180 pixels.

As the user scrolls down by another 100 channels, the relative position indicator will be at channel 500. The bottom section of the up scroll bar 804 will stretch from Y=90 to Y=240, and the top section of the down scroll bar 806 will be positioned between Y=240 and Y=390. Thus, the up scroll bar 804 will further elongate by 30 pixels, and the down scroll bar 806 will further shorten by 30 pixels.

Figure 7:
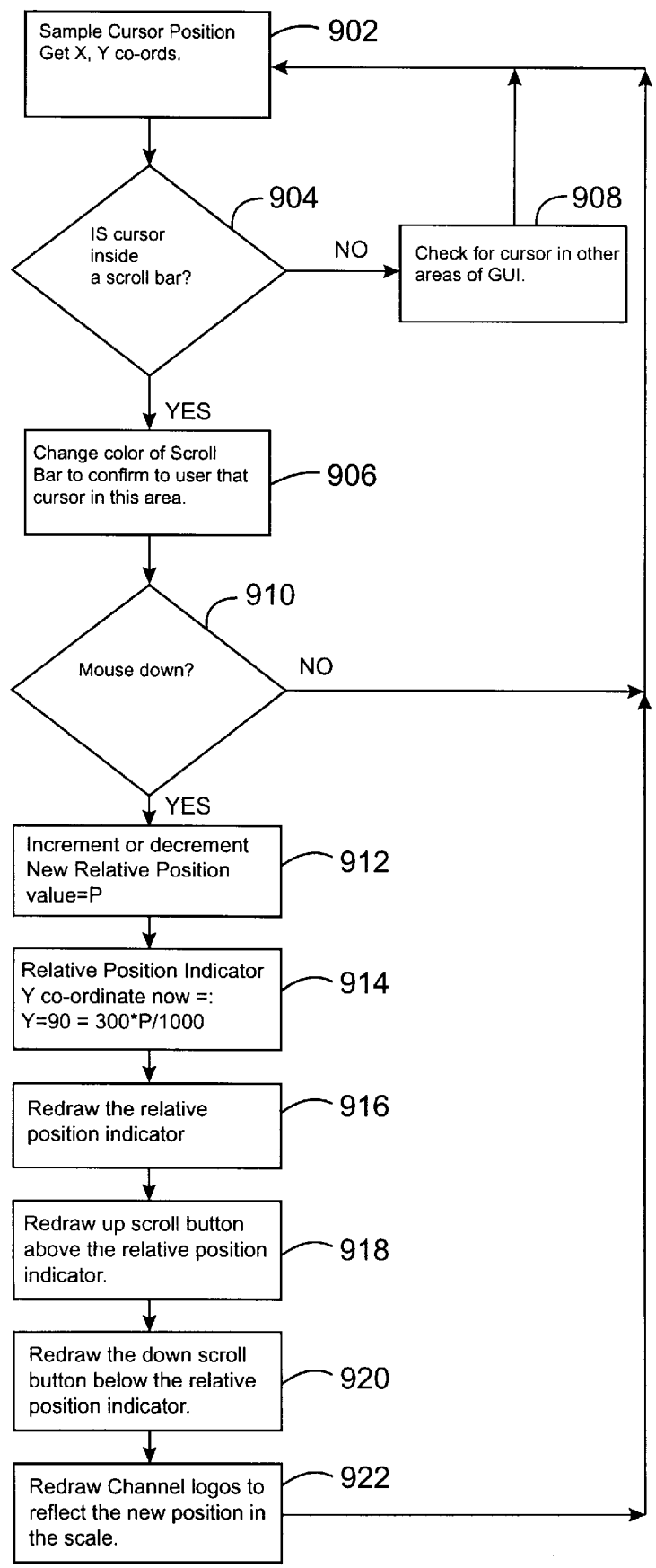
FIG. 7 is a flow chart that illustrates operations carried out in accordance with the present invention to dynamically change the sizes of the up and down scroll bars.

Reference is now made to FIG. 7 that illustrates operations carried out in accordance with the present invention to dynamically change sizes of the up and down scroll bars 804 and 806. In step 902, the pointing device held in the user's hand causes the cursor to move to the up or down scroll bar 804 or 806. Coordinates of the pointing device may be supplied to the microcontroller 344 on a periodic basis, for example, 60 times a second. In response, the CPU 318 samples the cursor positions to generate X, Y coordinates corresponding to a path for moving the cursor in alignment with pointing device movement. Cursor movement is achieved by multiple erasures and redraws of the cursor image performed on the path to the selected area. In step 904, the CPU 318 determines whether or not the cursor is inside one of the scroll bars 804 and 806. If so, the color of the corresponding scroll bar changes to indicate that the scroll bar is active (step 906). If no cursor inside the scroll bars 804 and 806 is detected, the CPU checks for cursor in the other areas of the GUI (step 908) and returns to sampling the cursor positions in step 902.

When a required cursor position inside the scroll bar 804 or 806 is reached, the user may press a select button on the pointing device. In step 910, the CPU 318 checks whether or not the select button is pressed. If so, the CPU 318 determines a value P that defines increment or decrement of the position of one of the scroll bars 804 and 806 relative to the position of the other. For example, if the down scroll bar 806 is activated to scroll down from channel 300 to channel 400, increment by 100 channels is detected. Thus, the value P is determined to be 100. If the decrement is detected, the value P is negative.

In step 914, the CPU 318 determines a value Y that defines a new Y-coordinate of the relative position indicator 808. For example, in a 1000 channel TV system, where the bottom section of the up scroll bar 804 and the top section of the down scroll bar 806 have 300 pixels in the vertical direction, if the old Y-coordinate of the relative position indicator 808 is 90 (the indicator set at channel 300), the value Y may be determined as Y=90+300×P/1000.

Based on the new Y-coordinate determined in step 914, the relative position indicator 808 is redrawn (step 916). Then, in step 918, the up scroll bar 804 is redrawn so as to arrange it above the relative position indicator 808. In step 920, the down scroll bar 806 is redrawn so as to arrange it below the relative position indicator 808. In step 922, channel logos and numbers displayed in the channel boxes 802 are redrawn to represent the channels indicated by the new position of the relative position indicator 808. The graphical objects on the screen are redrawn in accordance with the graphical object drawing procedure discussed above in connection with FIGS. 3 and 4.

There accordingly has been described a TV graphical user interface that includes a graphical channel changer for enabling a user to select a required TV channel among about 1000 channels provided by a satellite TV system. The graphical channel changer contains a vertical channel bar composed of channel boxes that display numbers and logos of selected TV channels. To switch the TV set to a required TV channel, the user directs the pointing device at the graphical channel box that indicates the required channel, and presses select. Up and down scroll bars, that allow the user to scan through the entire list of TV channels, extend beyond a safe area provided on a TV screen. The up and down scroll bars dynamically alter their size in accordance with the position of the subsequence of TV channels currently displayed relative to the entire sequence of TV channels representing the domain of choice, to provide the user with visual feedback. A relative position indicator is arranged between the up and down scroll bars.

In this disclosure, there are shown and described only the preferred embodiments of the invention, but it is to be understood that the invention is capable of changes and modifications within the scope of the inventive concept as expressed herein.

What is claimed is:

1. A television (TV) system comprising:
   a CPU, and
   a TV monitor controlled by said CPU for displaying a graphical user interface (GUI) having at least one channel object for identifying TV channels, and a control icon for changing the TV channels identified by said channel object,
   wherein said control icon dynamically varies its size with a change of the identified TV channels to indicate the relative position of a specific TV channel in relation to channels not currently displayed on said channel object.

2. The system of claim 1, wherein said control icon comprises a control bar that dynamically alters its size with a change of the identified TV channels.

3. The system of claim 1, wherein said control icon comprises an up scroll bar for scrolling up the displayed TV channels, and a down scroll bar for scrolling down the displayed TV channels.

4. The system of claim 3, wherein activation of said up scroll bar causes said channel object to identify a preceding TV channel followed by a currently identified TV channel in a channel list .

5. The system of claim 4, wherein activation of said down scroll bar causes said channel object to identify a subsequent TV channel following said currently identified TV channel in the channel list.

6. The system of claim 5, wherein said up scroll bar and said down scroll bar dynamically vary when said currently identified TV channel is changed by said channel object.

7. The system of claim 5, wherein relative size of said up scroll bar with respect to said down scroll bar dynamically varies when said currently identified TV channel is changed by said channel object.

8. The system of claim 5, wherein said up scroll bar shortens and said down scroll bar elongates when said channel object replaces said currently identified TV channel with said preceding TV channel.

9. The system of claim 8, wherein said up scroll bar elongates and said down scroll bar shortens when said channel object replaces said currently identified TV channel with said subsequent TV channel.

10. The system of claim 9, wherein said up scroll bar and said down scroll bar extend beyond a safe area provided on a TV screen to accommodate a picture to overscan conditions.

11. The system of claim 10, wherein said up scroll bar and said down scroll bar stretch between opposite edges of the screen.

12. The system of claim 9, wherein said GUI further has a relative position indicator arranged between said up scroll bar and said down scroll bar for indicating position of the currently identified TV channel relative to the channel list.

13. The system of claim 5, wherein said up scroll bar and said down scroll bar are activated by a remote pointing device.

14. The system of claim 5, wherein said channel object indicates numbers and logos of said TV channels.

15. A graphical user interface displayed on a screen of a monitor, comprising:

at least one identification object for showing identification data (ID), and a control icon for changing the ID shown by said identification object, said control icon including first and second control objects that dynamically and relatively vary in size with modification of the shown ID in relation to IDs not currently displayed on the screen.

16. The graphical user interface of claim 15, wherein said first control object is activated for changing a currently shown ID to a preceding ID that is followed by the currently shown ID in an ID list.

17. The graphical user interface of claim 16, wherein said second control object is activated for changing a currently shown ID to a subsequent ID following the currently shown ID in the ID list.

18. The graphical user interface of claim 17, wherein said first control object decreases in size and said second control object increases in size when said identification object replaces the currently shown ID with the preceding ID.

19. The graphical user interface of claim 18, wherein said first control object increases in size and said second control object decreases in size when said identification object replaces the currently shown ID with the subsequent ID.

20. In a graphical user interface displayed on a TV monitor and having at least one channel object for identifying TV channels, and up and down scroll bars for enabling a user to change TV channels identified by said channel object, a method of providing the user with visual feedback, comprising the steps of:

decreasing the size of said up scroll bar and increasing the size of said down scroll bar when said up scroll bar is activated to replace a TV channel currently identified by said channel object with a preceding TV channel followed by said currently identified TV channel in a list of TV channels, and increasing the size of said up scroll bar and decreasing the size of said down scroll bar when said down scroll bar is activated to replace said currently identified TV channel with a subsequent TV channel following said currently identified TV channel in said list of TV channels.

* * * * *